US006393521B1

(12) United States Patent
Fujii (10) Patent No.: US 6,393,521 B1
(45) Date of Patent: May 21, 2002

(54) INFORMATION PROCESSING APPARATUS

(75) Inventor: Hiroshige Fujii, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/140,280

(22) Filed: Aug. 26, 1998

(30) Foreign Application Priority Data

Aug. 26, 1997 (JP) .............................................. 9-229555

(51) Int. Cl.[7] .............................................. G06F 12/00
(52) U.S. Cl. ........................ 711/119; 711/171; 711/172
(58) Field of Search ............................ 710/127; 711/5, 711/119, 170–173, 117

(56) References Cited

U.S. PATENT DOCUMENTS

| | | | | |
|---|---|---|---|---|
| 5,748,872 A | * | 5/1998 | Norman ................. | 395/182.09 |
| 5,809,530 A | * | 9/1998 | Samra et al. ............... | 711/140 |
| 5,999,189 A | * | 12/1999 | Kajiya et al. ............... | 345/430 |
| 6,008,820 A | * | 12/1999 | Chauvin et al. ............ | 345/502 |
| 6,029,224 A | * | 2/2000 | Asthana et al. ................ | 711/5 |
| 6,161,167 A | * | 12/2000 | Witt ............................ | 711/136 |
| 6,260,114 B1 | * | 7/2001 | Schug ........................ | 711/129 |

FOREIGN PATENT DOCUMENTS

JP          4-217051        8/1992

OTHER PUBLICATIONS

Missing the Memory Wall: The Case for Processor/Memory Integration, A Saulsbury et al., Proceedings of International Symposium of Computer Architecture, pp. 90–101, May 1996.
A Multimedia 32b RISC Microprocessor with 16Mb DRAM, T. Shimizu et al., ISSCC Digest of Technical Papers, pp. 216–217 Feb. 1996.
A 32bit Microprocessor with 16Mbit DRAM, N. Okumura et al., Technical Report of IEICE, ICD 96–7, pp. 49–55, Apr. 1996.
PPRAM: A Novel Monolithic–Memory & Multiprocessor ASSP (Application–Specific Standard Product) Architecture K. Murakami et al., Technical Report of IEICE, ICD 96–13, pp, 97–104, Apr. 1996.

* cited by examiner

*Primary Examiner*—Matthew Kim
*Assistant Examiner*—Pierre M. Vital
(74) *Attorney, Agent, or Firm*—Finnegan, Henderson, Farabow, Garrett & Dunner, L.L.P.

(57) ABSTRACT

An information processing apparatus comprises a first memory, a first cache memory provided for the first memory and having a cache line size according to the bandwidth of the first memory, a second memory having a bandwidth different from that of the first memory, and a second cache memory provided for the second memory and having a cache line size according to the bandwidth of the second memory.

15 Claims, 6 Drawing Sheets

FIG. 5A  BEFORE REFILLING

FIG. 5B  AFTER REFILLING

FIG. 6A   BEFORE REFILLING

FIG. 6B   AFTER REFILLING

INFORMATION PROCESSING APPARATUS

BACKGROUND OF THE INVENTION

The present invention relates to an information processing apparatus, especially, to an information processing apparatus which uses a memory integrated microprocessor and so on.

Generally, a main component which determines a performance of the computer system is a processor and a memory. The improvement of the semiconductor technology is improving the operation frequency of the processor at twice in 2 years. However, the access speed of the memory of DRAM or the like which comprises main memory (called the main memory or merely called a memory) is not faster than that of the processor. Then, a cache memory is used to make up for the difference between this processor speed and the memory speed.

The cache memory utilizes the temporal and the spatial locality of the memory access. That is, the following two facts are utilized (1) the once accessed data has the high possibility to be again accessed and (2) data near the data which was accessed, too, has the high possibility to be accessed.

When the speed difference between the processor and the memory becomes large, the memory access time relatively becomes large. Therefore, the performance of the processor is not improved unlike an improvement of an operation frequency of the processor. To make the performance of the processor high, the memory access time must then be made short. In the processor which loads the cache memory, when there is data to be accessed in cache (hit), the main memory is not accessed. Therefore, only when there is no data in cache (the miss), main memory will be accessed and the average memory access time to the substantial main memory is as follows.

(average memory access time)=(miss rate)×(refill time)  (1)

As shown in this formula, to make memory access time short, it is necessary to make miss rate small or the refill time small. The refill time means the time required for the cache refill processing to read data from the main memory in case of the cache miss and restore it into the corresponding cache line.

A technique that involves having a main memory and the processor on the same chip is one technique for shortening the average memory access time. Since a main memory and a processor are loaded onto the same chip, the following advantages are obtained. Since it is unnecessary to access outside of the chip when accessing main memory, it is unnecessary to pass via the input/output buffer. Since the parasitic capacity such as the wiring capacity outside of the chip becomes small, the access time can be shortened. When the memory is allocated out of the processor chip, it is not possible to widen the bit width of the memory which can be accessed at once from the constraint of the number of the pins on the processor chip. In contrast, when the memory is allocated in the same chip, since there is not a such constraint of the number of the pins, the bit width of the memory which can be accessed at once can be widened. Since the bit width which can be accessed at once cannot be widened when the memory is allocated out of the chip, generally, one refill operation is realized by the memory access with several times. One refill operation can be performed by one memory access, because a data size capable of accessing for one access can be widened to a line size of cache when the memory is allocated in the chip. Therefore, the memory access time can be shortened.

The typical line size of the cache memory which is adopted with the present commercial processor is about 16 B (byte) or 32 B. There is a chche memory which utilizes the memory bit width which can be widened as mentioned above, and which proposes a cache memory with the line size 512B. Document [1] (Asheley Saulsbury, Fong Pong and Andreas Nowatzyk, "Missing the Memory Wall: The Case for Processor/Memory Integration," in Proc. International Symposium on Computer architecture, pp. 90–101, May 1996)}

When a line size is enlarged in this way, not only the data of the address to be accessed but also peripheral data with the line size are simultaneously taken with the cache memory, and as a result, a prefetch effect is obtained. Especially in case of the instructin cache, since most of access is a sequential access to access a continued memory area in order to extensively reduce the cache miss rate. In the case of the data cache, however, the effect is not consistent. This is because for one application the miss rate may be extensively improved, but, conversely, for another application the miss rate may become high. enlarged in this way, not only the data of the address to be accessed but also peripheral data with the line size are simultaneously taken with the cache memory, and as a result, a prefetch effect is obtained. Especially in case of the instruction cache, since most of access is a sequential access to access a continued memory area in order to extensively reduce the cache miss rate. In the case of the data cache, however, the effect is not consistent. This is because for one application the miss rate may be extensively improved, but, conversely, for another application the miss rate may become high.

In the processor in which the main memory is loaded onto the chip, the main memory capacity on the chip is constant and can not be increased later. However, it is necessary to be able to increase main memory capacity in the computer system. The way of increasing main memory capacity includes the way of adding a memory chip at an outside of the chip and the way of adding a memory integrated processor. {(Document [1], Document [2] (Murakami et al., "The memory-multiprocessor integrated ASSP (Application-Specific Standard Product) architecture : PPRAM", IEICE technical report, ICD96-13, April, 1996))}

Figure 1:
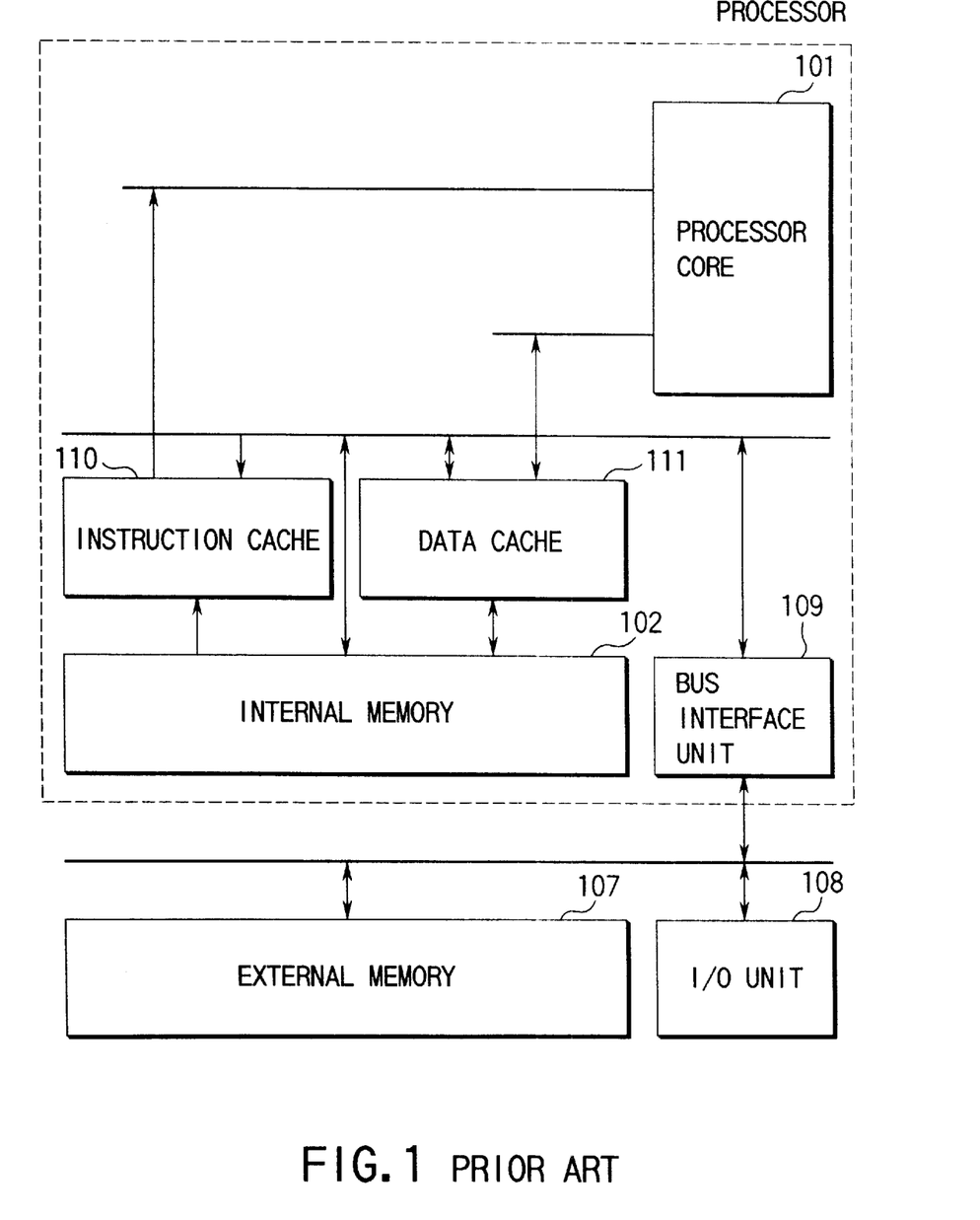
FIG. 1 is a block diagram which shows the structural example of the conventional information processing apparatus.

In the view point from the processor which tries to access the memory, since either when adding a memory chip outside of the chip and adding a memory integrated processor of the accessed memories are allocated at an outside of the chip, it is possible to assume that they are same. Therefore, it assumes that the chip is an external memory chip, even when a memory integrated processor is added. FIG. 1 shows the structure of the computer system in this case.

The memory integrated processor is composed of a processor core 101, an internal memory 102, a bus interface unit 109, an instruction cache 110, and a data cache 111 as shown in the figure. The memory integrated processor is connected to an external I/O unit 108 and an external memory 107 through a bus interface unit 109.

The memory contents of memory 102 in the chip and the external memory 107 which is added at an outside of the chip are temporarily stored in the cache memories 110 and 111, and are accessed from the processor core 101.

In the DRAM integrated processor chip which is described in the document [3] (Toru Shimizu,et al., "A Multimedia 32 b RISC Microprocessor with 16 Mb DRAM" in Proc. International on Solid-State Circuits Conference, pp. 216–217, Feb. 1996) and the document [4] (Okumura et al., "the 32-bits microprocessor containing 16-Mbits DRAM", IEICE technical report, ICD96-7, April, 1996), the line size of the cache memory is 32 B and is equal the line size to that of the processor in which the DRAM is not integrated. That is, this document does not use the fact that a cache line size can be enlarged by containing main memory. Also, this chip has two modes as the way of use of the on-chip cache. One mode is that the on-chip cache is operated as data/instruction cache of the contained memory when using only an contained memory without the external memory. In another mode, when using an external ROM as the instruction memory, the on-chip cache is operated as an instruction cache to an external ROM. That is, one cache in the chip is used as the cache of both of the contained memory and the external memory.

As mentioned above, by adding an external memory or a memory contained processor chip in the conventional system which used a memory contained processor chip the memory capacity of the main memory is extended. It is considered that the data which is transferred from the external memory to which is added is stored in the cache which is used for the internal memory. To utilize an contained memory effectively, the quite large line size must be used. On the other hand, since the physical number of the pins which can be used is limited, it is not possible to widen the bit width when transferring data from the external memory. Therefore, it takes a long time to transfer data with line size of the cache in which the line size is enlarged for the contained memory, and the performance of the processor falls for this purpose. On the other hand, when making a cache line size small according to the bandwidth of the external memory, the large input/output width of the internal memory becomes not able to be sufficiently utilized.

BRIEF SUMMARY OF THE INVENTION

The object of the present invention is to provide an information processing apparatus capable of reducing an average memory access time for both of an internal memory having a large bandwidth and an outside memory having a small bandwidth.

To achieve the above subject matter, an information processing apparatus of the present invention comprises a plurality of memory devices having the different bandwidths and the cache memory storing the data of the memory devices, and can refill data having sizes according to the bandwidths of the memory devices when refilling the data to the cache memory.

That is, the size (the refill size) of the data to be read by one refill according to the bandwidth (the capability to transfer data) of the memory device to each memory device can be determined. When the plurality of caches exist, one cache which can be refilled at the refill size to each memory device is selected, and data from the corresponding memory device is stored to the selected cache.

The procedure of the access to the memory device is as follows. In this case, it is assumed that an accessing address and a data size are given. First, whether or not the given address exists in the cache is examined. If the address exists, the data is read from the cache and transferred to a destination register of the processor core. When the address does not exist in the cache, first, a line in the cache to be stored is determined. When there is possibility that the data of the line does not coincide with the memory device (when the line is rewritten after refill), the data stored in the line is written back to the memory device. Next, the data of the given address is read from the memory device and is refilled. The size of the refilling data is predetermined according to the capability of transfer data of an accessing memory device. Moreover, data of the given address for data having a given data size is transferred to the destination register among the refilled data.

The average memory access time becomes able to be reduced for both of the internal memory having the large bandwidth and the external memory having the small bandwidth, and the processing performance becomes able to be improved by refilling data having a size according to the bandwidth of the memory device to be accessed, during refilling data to the cache memory.

The structure for refilling the data having a size according to the bandwidth of the accessing memory device to the cache memory can be realized by, not only a structure preparing a plurality of cache memories with different cache line size, but also use of a cache memory having a changeable cache line size and so on.

As explained above, data having a size according to the bandwidth of the memory device accessed in refill operation to the cache memory is refilled according to the present invention. Therefore, the refill time to the cache memory becomes short, and the average memory access time is reduced from the external memory to be able to improve a performance of the processor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are contained in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the embodiments of the present invention will be explained referring to the drawing.

Figure 2:
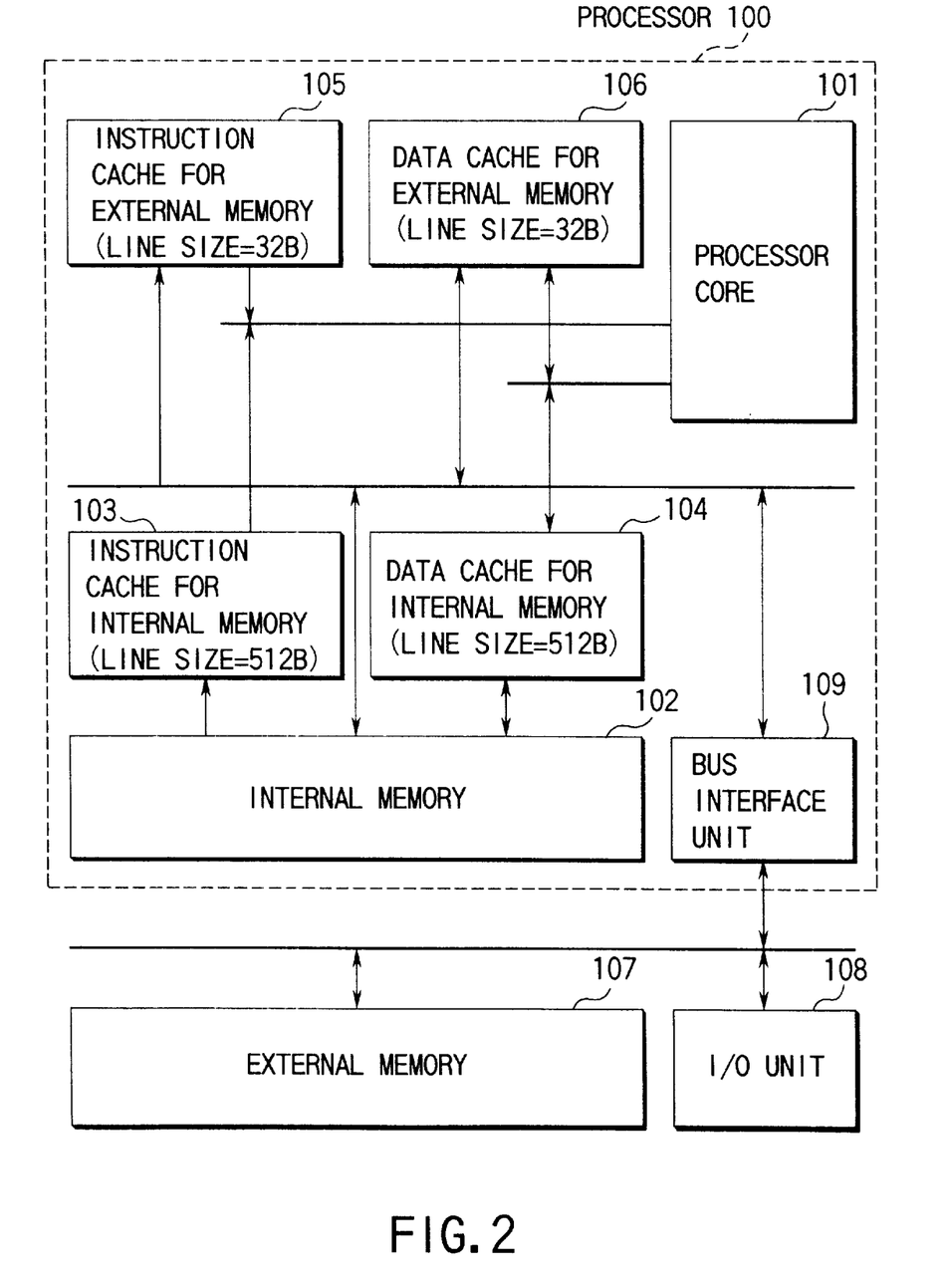
FIG. 2 is a block diagram which shows the structure of the information processing apparatus according to a first embodiment of the present invention.

FIG. 2 shows the structure of the information processing apparatus according to an embodiment of the present invention. The information processing apparatus is the computer system using a processor chip 100 containing a memory. The processor chip 100 has a processor core 101, a main memory 102 with 16 MB (hereinafter, so called as an internal memory), an instruction cache 103 (an instruction cache for the internal memory) with 512 B direct mapped with 512 B line size and 8 kB capacity, a data cache 104 (an data cache for the internal memory) with 512 B line size, 2-way set associative and 16 kB capacity, an instruction cache 105 (an instruction cache for the external memory) with 32 B mapped with 32 B line size and 8 kB capacity, a data cache 106 (an data cache for the external memory) with 32 B line size, 2-way set associative and 16 kB capacity, and bus interface unit 109. A 16 MB main memory 107 (the external memory) and an I/O unit 108 are provided outside of the processor chip 100.

The caches 103, 104 for the internal memory with line size 512 B store the code and data of the internal memory 102 respectively, the caches 105, 106 for the external memory with line size 32 B store the code and data of external memory 107 respectively.

The internal memory has an address space from 00000000H to 00ffffffH (H indicates hexadecimal notion) and the external memory has an address space from 01000000H of addresses which follow it to 01ffffffH. In this case, it is possible to judge from the address whether the given address is the address of internal or external address. In other words, in this example, it is judged the address is an address of the inner memory 102 if the upper 8 bits are 00H, and it is judged the address is an address of external memory 107 if the upper 8 bits are 01H.

The internal memory 102 can read and write the data of 512 B by one access. It requires 5 cycles for one access. The external memory 107 can read and write the data of 8 B by one access. When using burst transferring, four cycles are necessary to access first 8 B, thereafter two cycles are necessary to access every 8 B.

Hereinafter, the first embodiment will be explained.

This apparatus operates as follows when fetching an instruction.

1. It judges whether the instruction address is stored in the internal memory 102 or the external memory 107 from the instruction address stored in the program counter for the instruction fetch (not shown) in processor core 101.

2. When the instruction address is in the internal memory 102.
   (a) The instruction cache 103 is accessed and examined whether or not the instruction address exists in the instruction cache 103.
   (b) When the instruction address exists in the instruction cache 103 (hit), the instruction of the address from the instruction cache 103 is read and transferred to an instruction fetch unit (not shown) in the processor core 101.
   (c) When the instruction address does not exist in instruction cache 103 (miss), the data having the line size (512 B) containing the address is read from internal memory 102 and is refilled to instruction cache 103, and moreover the instruction of the instruction address is transferred to the instruction fetch unit in processor core 101.

3. When the instruction address is in external memory 107.
   (a) The instruction cache 105 is accessed and examined whether or not the instruction address exists in the instruction cache 105.
   (b) When the instruction address exists in the instruction cache 105, the instruction of the address from the instruction cache 105 is read and transferred to an instruction fetch unit (not shown) in the processor core 101.
   (c) When the instruction address does not exist in instruction cache 105, the data having the line size (32 B) containing the address is read by the burst transfer cycle and is refilled to instruction cache 105. Moreover the instruction of the instruction address is transferred to the instruction fetch unit in processor core 101.

When executing a load instruction, the following operation is executed.

1. The address to be accessed by the processor core 101 is calculated.

2. It judged whether the address is in the internal memory 102 or the external memory 107 from the address.

3. When the corresponding address is in the internal memory 102.
   (a) Whether or not the address exists in the data cache 104 is examined.
   (b) When the address exists in data cache 104 (hit), the data of the address is read from the data cache 104 and is stored in the destination register in the processor core 101.
   (c) When the address does not exist in data cache 104 (miss), first, the line which it should substitute is determined by using the method such as the LRU method. When the dirty bit of the line is set, the data of 512 B of the line is written back to the internal memory 102. Next, the data of 512 B including the address data is read from the internal memory 102 and is refilled to the data cache 104, and moreover the address data is stored in the destination register in the processor core 101.

4. When the corresponding address is in the external memory 107.
   (a) Whether or not the address exists in the data cache 106 is examined.
   (b) When the address exists in the data cache 106 (hit), the data of the address is read from the data cache 106 and is stored in the destination register in the processor core 101.
   (c) When the address does not exist in data cache 106 (miss), first, the line to be substituted is determined by using the method such as the LRU method. When the dirty bit of the line is set, the data of 32 B of the line is written back to the external memory 107. Next, the data of 32 B including the address data is read from the external memory 107 and is refilled to the data cache 106, and moreover the address data is stored in the destination register in the processor core 101.

A store instruction is executed similar to the load instruction.

In the first embodiment, when accessing the address which is allocated to the internal memory 102, the refill size is 512 B and the refill time is 5 cycles. On the other hand, when accessing the address which is allocated to the external memory 107, the refill size is 32 B and the refill time is 10 cycles. In the conventional art as shown in FIG. 1, the refill size is 512 B together and the refill time is 5 cycles when accessing the address which is allocated to the internal memory, and the refill time becomes 130 cycles when accessing the address which is allocated to the external memory.

It is assumed that 50% of addresses to be accessed is allocated to the internal memory 102 and 50% of addresses to be accessed is allocated to the external memory 107. When the average refill times of the first embodiment and the conventional art are computed, the following result is obtained.

In the first embodiment,

5×0.5+10×0.5=7.5 cycles.

On the other hand, in the conventional art,

5×0.5+130×0.5=67.5 cycles.

As a result, it is found that average memory access time is reduced since the average refill time of the first embodiment becomes ⅑ of the conventional refill time.

In the first embodiment, the cache memories are separated for the internal memory and the external memory but the cache memories for internal and external memories may be integrated into one cache memory. An example in which a cache for the internal memory and a cache for the external memory are integrated-into one cache will be hereinafter explained as the second embodiment.

Figure 3:
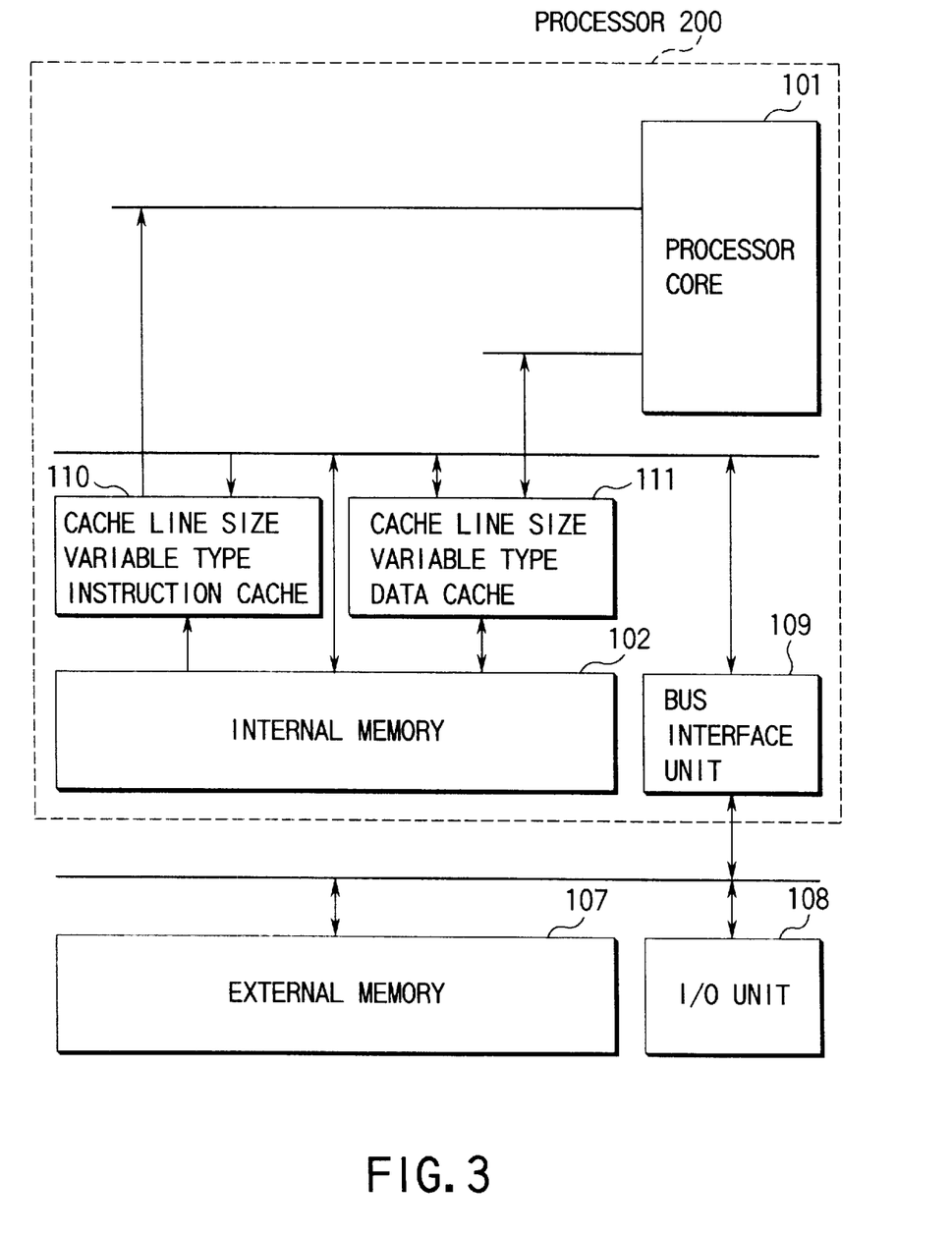
FIG. 3 is a block diagram which shows the structure of the information processing apparatus according to the second embodiment of the present invention.

FIG. 3 shows the structure of the information processing apparatus according to a second embodiment. Here, the same references are given to the same portions as in FIG. 2 and a different point will be mainly explained.

The processor chip 200 of the information processing apparatus has a processor core 101, a main memory 102 with 16 MB (internal memory), an instruction cache 110 with 512 B or 32 B direct mapped with 512 B or 32 B line size and 16 kB capacity, a data cache 111 with 512 B or 32 B line size, 2-way set associative and 32 kB capacity, and a bus interface unit 108. A 16 MB main memory 107 (external memory) and an I/O unit 108 are provided outside of the processor chip 200.

The cache memories 110 and 111 used in this embodiment are the caches which have two kinds of refill sizes (refilled data sizes) and can make a refill size 512 B or 32 B. Such a cache has the following structure.

1. An accessing basic unit is 32 B and each unit has the information of a tag, a valid flag, and a dirty flag. The 32 B unit is called as a subline. The sublines in which the number thereof is equal to the number of ways constitute one subset.

2. Operations of judgment of hit or miss, and read/write at hit are executed by the 32 B subline as a basic unit, and are equal to the cache of usual 32 B line.

3. The difference from the usual cache is that, in the successive 16 subsets, the sublines are selected from each subset one by one, and the selected 16 sublines can be simultaneously accessed. In other words, 16 sublines constitute one line and can be accessed as the 512 B line. Thereby, the data of 512 B can be refilled at once in the successive 16 subsets. With this time, an identical tag is stored to each subline which constitutes the line.

Figure 4:
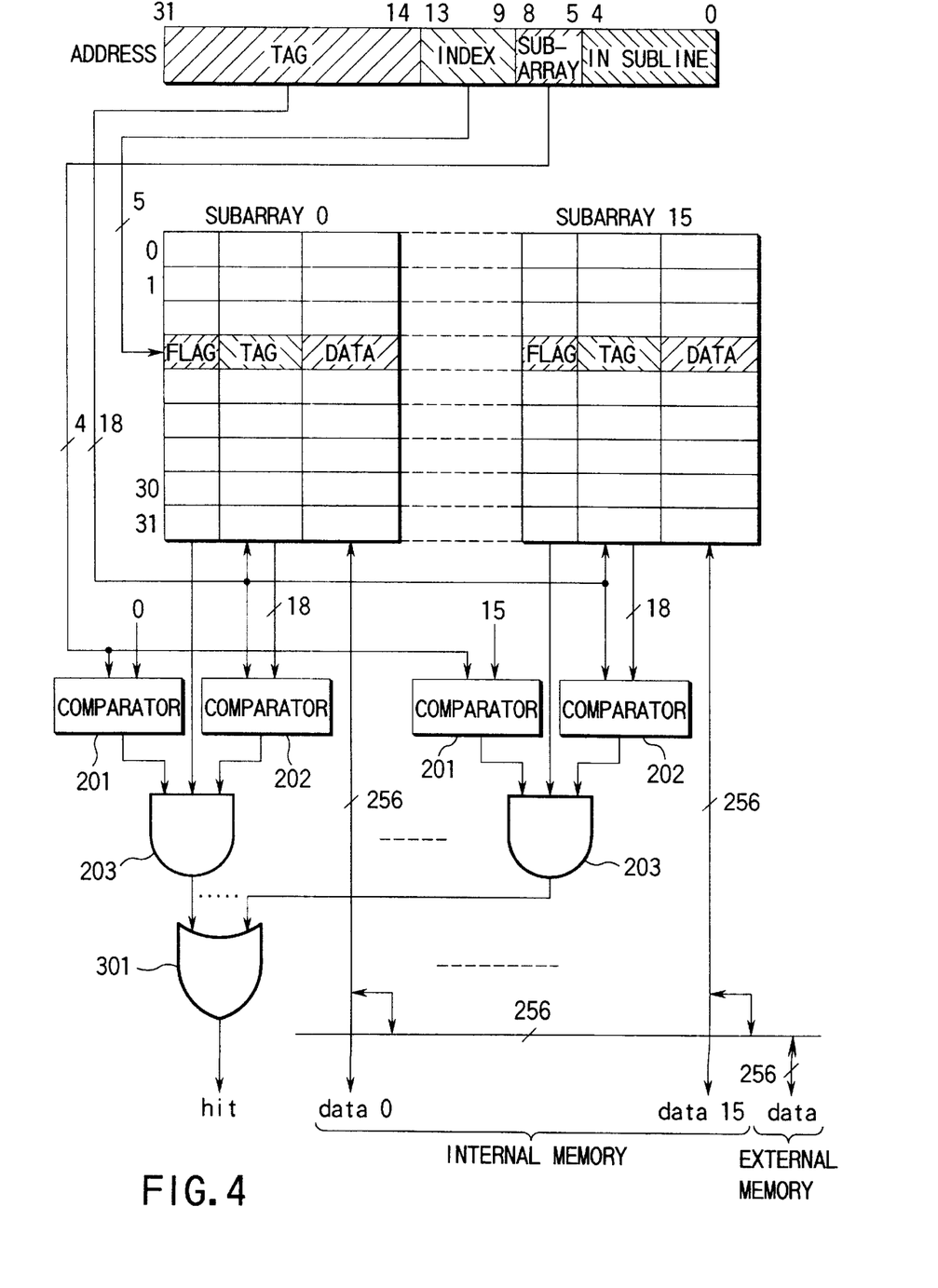
FIG. 4 is an example showing a concrete structure of the line size variable cache which is used in the information processing apparatus of the second embodiment.

FIG. 4 shows an example with the concrete structure of the cache memory which has two kinds of refill sizes as explained above.

The cache shown in FIG. 4 is the structural example of the instruction cache 110 of FIG. 3, and the memory section of this cache consists of 16 subarrays having subarrays (0) to (15). Each subarray consists of 32 sublines. Each subline retains flags such as the data of 32 B, the tag and the valid flag.

One line is selected from 32 lines in 5 bits (index portion) of 9th-bit to 13th-bit of the address and one subarray is selected from 16 subarrays in 4 bits (subarray portion) of 5th-bit to 8th-bit of the address. If the tag of the selected subline coincides with the 18 bits (tag portion) from 14th-bit to 31st-bit of the address, a given address is judged to hit this cache and the data is read and written via the bus data of 32 B (256 bits). If not hitting, the cache is refilled. When refilling data to the cache from the internal memory 102, data is written by using the data lines from data0 to data15 into all sublines in the selected set, i.e., 16 successive subsets. The tag portion of the given address is stored into the tag in the refilled subline. On the other hand, when refilling data to the cache from the external memory 107, data is only written into the selected sublines of the subarray selected in the subarray portion of the address. Data is written via the data line corresponding to the selected subarray. The tag writes the tag portion of the given address.

The hit or miss for every subarray is judged by the comparators 201 and 202, and AND gate 203 which are provided in each subarray. In this case, the comparator 201 compares subarray portion of the address with the corresponding subarray number, and the comparator 202 compares the tag portion of the address with the tag read from the selected subline. If the data of selected subline is valid and the subarray whose tag coincides exists, a hit signal is output from an OR gate 301. Then, a selected subline among the sublines in which "1" is output from AND gate 203 is accessed.

The operation of the second embodiment is substantially the same as the operation of the above-mentioned first embodiment. That is, an integration instruction cache 110 is accessed instead of accessing the instruction cache 103 for the internal memory and the instruction cache 105 for the external memory in the first embodiment. The integration data cache 111 is accessed instead of accessing the data cache 104 for the internal memory and data cache 106 for the external memory. When the accessed memory is the internal memory 102, a refill size is 512 B. When the accessed memory is the external memory 107, a refill size is 32 B.

Next, a processing in case of the cache miss according to the second embodiment will be explained.

1. When an address is allocated to the internal memory 102.

Figure 5A:
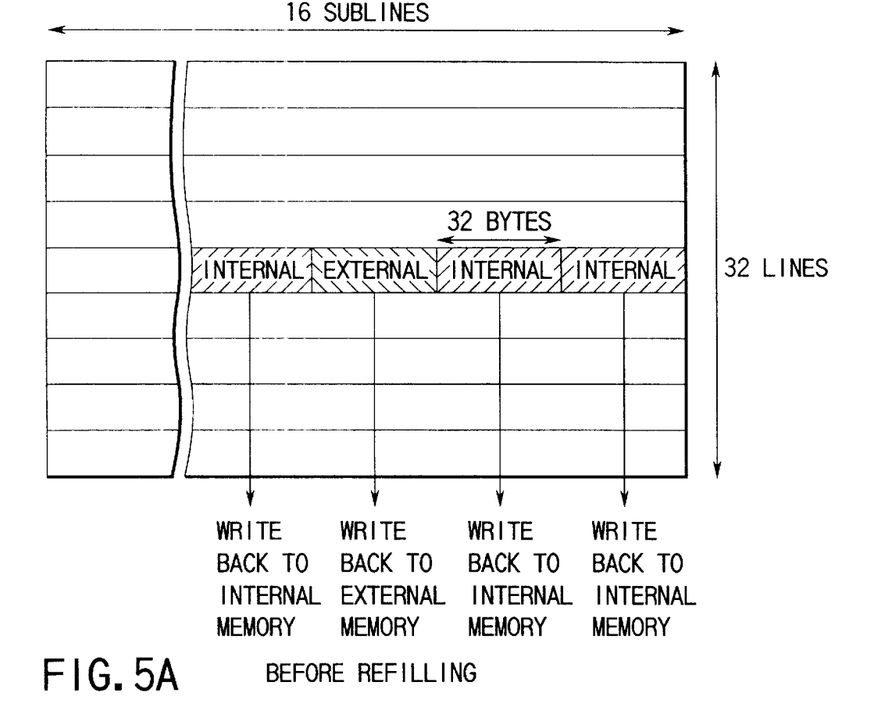
FIGS. 5A and 5B are figures for explaining a refill operation to the cache from the internal memory in the information processing apparatus of the second embodiment.
Figure 5B:
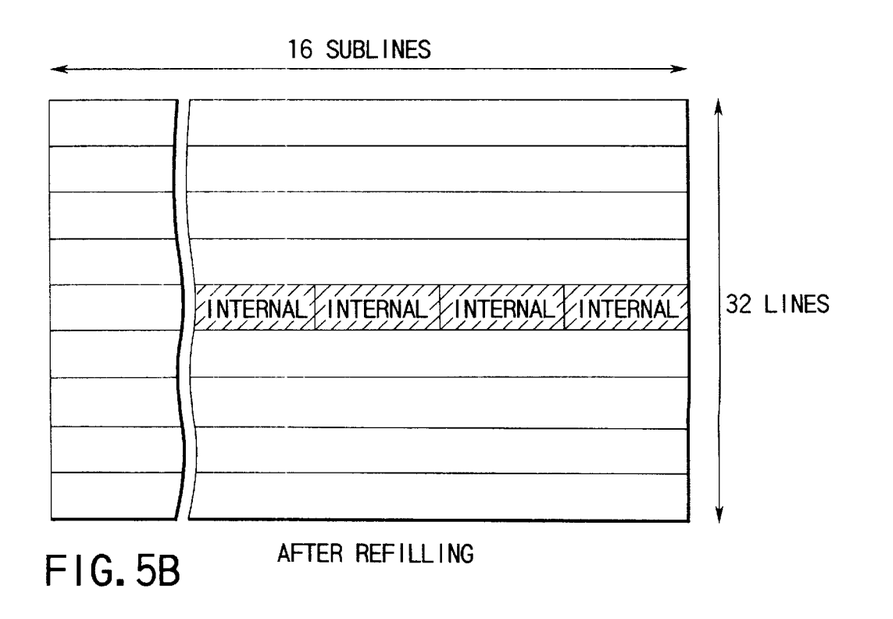

One line (16 sublines) is substituted as shown in FIGS. 5A and 5B. Since an internal memory data and an external memory data are stored in the line in which the data should be stored, the internal memory data is written back to the internal memory 102 and the external memory data is written back to the external memory 107. Next, data for 512 B (256 bits×16) is read from the internal memory 102 and is stored in the line. In this case, a tag is appropriately set for every subline according to the address of the 32 B data stored therein.

2. When an address is allocated to the external memory 107.

Figure 6A:
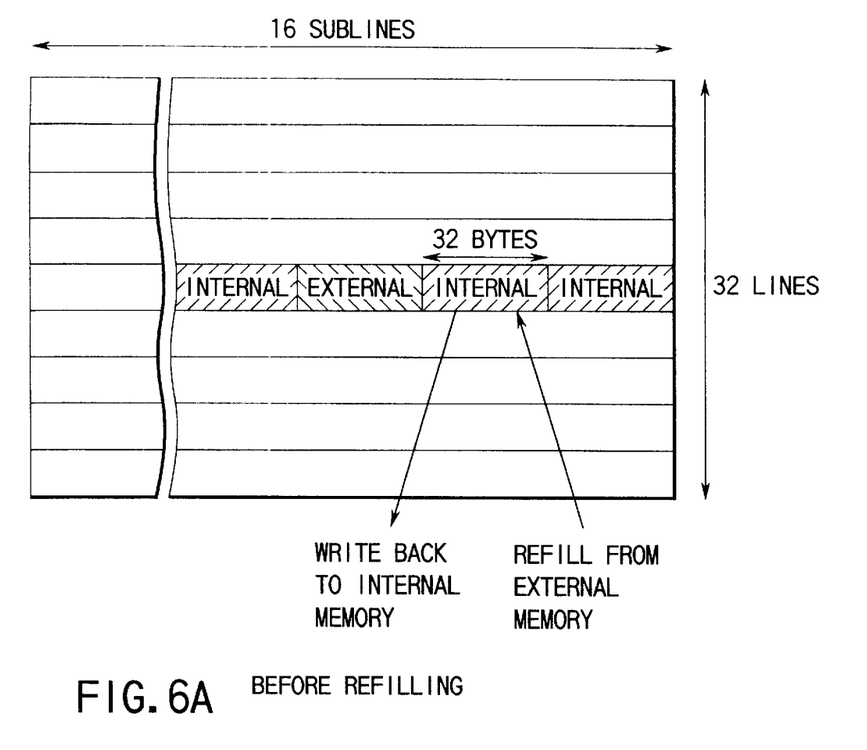
FIGS. 6A and 6B are figures for explaining a refill operation to the cache from the external memory in the information processing apparatus of the second embodiment.
Figure 6B:
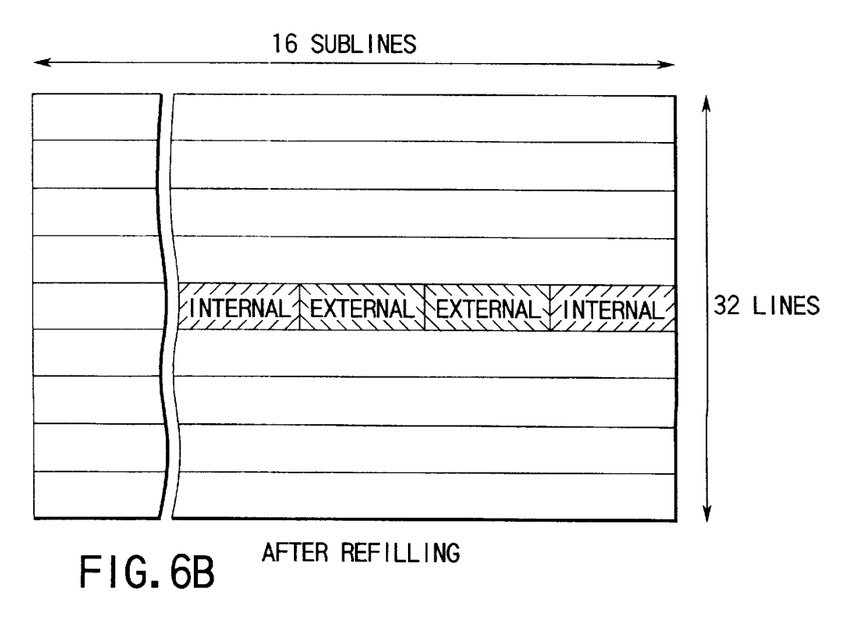

One subline is substituted as shown in FIGS. 6A and 6B. First, when a dirty bit is set to the data stored in the line in which data should be stored, the corresponding data is written back to the memory. The stored data is one of the data of the external memory 107 and the data of the internal memory 102. Therefore, according to the tag read from the subline, in case of the data of the external memory 107, the data of the subline is written back to the external memory 107, and in case of the data of the internal memory 102, to the internal memory 102. Next, the data is read from the external memory 107 and is stored in the subline. The tag portion of the address is stored in the tag of the subline.

One of the differences of the first embodiment and the second embodiment is miss rate. In the first embodiment, the cache memory for the internal memory is independently provided to the cache memory for the external memory. On the other hand, in the second embodiment, the shared cache memory of the external memory and the internal memory is provided. Therefore, when the capacity of the cache memories are the same, the hit rate of the second embodiment may become higher than that of the first embodiment. For example, when executing the program which uses only the internal memory 102, in the first embodiment, only the 8 KB instruction cache and the 16 KB data cache can be used. On the other hand, in the second embodiment, the 16 KB instruction cache and the 32 KB data cache can be used. Therefore, it is apparent the hit rate of the second embodiment is higher than that of the first embodiment, and the apparatus according to the second embodiment has high performance.

Another difference is a write back operation in case of line substitution. In the first embodiment, the memory to be written back and the memory to be read are identical and the data size thereof is identical. On the other hand, the access target memory may differ from the memory to be written back in the second embodiment, and it may be written back to a plurality of memories. The written back data size is not always the same. In other words, when accessing the data of the external memory 107, the memory to be written back may be the external memory 107 or the internal memory 102. When accessing the data of the internal memory 102, there are three cases, wherein only the internal memory 102 is written back, only the external memory 107 is written back, and both of the internal memory 102 and the external memory 107 are written back. By temporarily storing the written back data to the buffer, in any case, the degradation of the performance by the memory access for write back can be reduced.

Since it is not essential at the present invention about the virtual memory adopted with a usual computer, the corresponding description is omitted in the embodiments, but the present invention can apply to the system which uses a virtual memory. Also, a memory system including L2 cache and the memory integrated processor can be used as an external memory.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing apparatus comprising:
a first memory;
a first cache memory provided corresponding to said first memory and having a cache line size according to the bandwidth of said first memory;
a second memory having a bandwidth different from that of said first memory; and
a second cache memory provided corresponding to said second memory and having a cache line size according to the bandwidth of said second memory.

2. The information processing apparatus according to claim 1, wherein the bandwidth of said first memory is larger than the bandwidth of said second memory, and said first memory is an on-chip memory and said second memory is an off-chip memory.

3. The information processing apparatus according to claim 2, wherein said second memory includes a third cache memory.

4. An information processing apparatus comprising:
a first memory;
a second memory having a bandwidth different from that of said first memory; and
a cache memory storing a part of memory contents of each of said first memory and said second memory,
wherein
said cache memory has a variable cache line size, and
the cache line size of said cache memory is changed to a size according to a bandwidth of said first memory and second memory as an access target when refilling data to the cache.

5. The information processing apparatus according to claim 4, wherein the bandwidth of said first memory is larger than the bandwidth of said second memory, and said first memory is an on-chip memory and said second memory is an off-chip memory.

6. The information processing apparatus according to claim 5, wherein said second memory includes a second cache memory.

7. The information processing apparatus according to claim 4, wherein
said cache memory includes a plurality of subarrays each constituted by a plurality of sublines, and
data is refilled to said cache memory for a unit of one subline among corresponding sublines in said plurality of subarrays or a plurality of sublines existing in the same position of said plurality of subarrays.

8. An information processing apparatus comprising:
a plurality of memories having different bandwidths from each other; and
a cache memory for storing data of said plurality of memories, wherein
data having a size according to the bandwidth of an access target memory is refilled to said cache memory when refilling said cache memory.

9. The information processing apparatus according to claim 8, wherein at least one of said plurality of memories is an on-chip memory, and has a larger bandwidth than that of other memories.

10. An information processing apparatus, which comprises a processor chip containing a memory and is capable of mounting an external memory for extending a memory, comprising:
a cache memory contained in said processor chip for retaining data of an internal memory contained in said processor and said external memory, wherein
data having a first size according to a bandwidth of said external memory is refilled, when refilling data from said external memory to said cache memory, and
data having a second size according to a bandwidth of said internal memory which is larger than that of said external memory is refilled when refilling data from said internal memory to said cache memory.

11. The information processing apparatus according to claim 10, wherein a bandwidth of said internal memory is larger than that of said external memory.

12. The information processing apparatus according to claim 10, wherein said external memory includes a second cache memory.

13. An information processing apparatus comprising;
a processor chip containing an internal memory;
an external memory provided outside of said processor chip; and
a cache memory for storing a part of contents of said internal memory and said external memory, wherein said cache memory refills data according to bandwidths of said internal memory and said external memory.

14. The information processing apparatus according to claim 13, wherein a bandwidth of said internal memory is larger than that of said external memory.

15. The information processing apparatus according to claim 13, wherein said external memory includes a second cache memory.

* * * * *